United States Patent
Liu et al.

(10) Patent No.: US 12,135,482 B2
(45) Date of Patent: Nov. 5, 2024

(54) GENERATING METHOD OF POST SPACER ARRAY PATTERN OF DISPLAY PANEL, GENERATING DEVICE THEREOF, AND ELECTRONIC DEVICE

(71) Applicant: Shenzhen China Star Optoelectronics Semiconductor Display Technology Co., Ltd., Guangdong (CN)

(72) Inventors: Siyang Liu, Guangdong (CN); Zui Wang, Guangdong (CN)

(73) Assignee: Shenzhen China Star Optoelectronics Semiconductor Display Technology Co., Ltd., Shenzhen (CN)

( * ) Notice: Subject to any disclaimer, the term of this patent is extended or adjusted under 35 U.S.C. 154(b) by 0 days.

(21) Appl. No.: 17/426,680

(22) PCT Filed: May 24, 2021

(86) PCT No.: PCT/CN2021/095489
§ 371 (c)(1),
(2) Date: Nov. 17, 2022

(87) PCT Pub. No.: WO2022/236869
PCT Pub. Date: Nov. 17, 2022

(65) Prior Publication Data
US 2024/0012293 A1 Jan. 11, 2024

(30) Foreign Application Priority Data
May 8, 2021 (CN) .......................... 202110501303.1

(51) Int. Cl.
*G02F 1/1339* (2006.01)

(52) U.S. Cl.
CPC ................................ *G02F 1/13394* (2013.01)

(58) Field of Classification Search
CPC .. G02F 1/13394; G02F 1/1339; G02F 1/0107; G02F 1/13396; H01J 9/242; H01J 11/36; H01J 2211/36; H01J 2217/49271
See application file for complete search history.

(56) References Cited

U.S. PATENT DOCUMENTS

| | | | |
|---|---|---|---|
| 2013/0250195 A1* | 9/2013 | Koito | G02F 1/1313 349/15 |
| 2021/0327039 A1* | 10/2021 | Sun | G02F 1/13394 |
| 2022/0357607 A1* | 11/2022 | Song | G02F 1/1347 |
| 2023/0070022 A1* | 3/2023 | Wang | G02F 1/13394 |

FOREIGN PATENT DOCUMENTS

| | | |
|---|---|---|
| CN | 104516158 | 4/2015 |
| CN | 108563046 | 9/2018 |
| CN | 109800534 | 5/2019 |
| CN | 110764315 | 2/2020 |
| CN | 111679474 | 9/2020 |
| WO | WO 2015/108304 | 7/2015 |

\* cited by examiner

*Primary Examiner* — Mariam Qureshi

(57) ABSTRACT

In a design stage of post spacers of a display panel, the present application generates a post spacer array pattern that meets requirements of a user according to a drawing layer data, a ratio data, and a positioning mode data of each of types of the post spacers determined by the user. This realizes an intelligent design of the post spacers of the display panel and eliminates manual judgments and modifications, thereby increasing efficiency and accuracy of a design process of the post spacers of the display panel.

17 Claims, 2 Drawing Sheets

Obtaining a drawing layer data, a ratio data, and a positioning mode data of each of the types of the post spacers determined by a user. — S1

Generating the post spacer array pattern according to the drawing layer data, the ratio data, the positioning mode data, and a preset design rule of each of the types of the post spacers. — S2

GENERATING METHOD OF POST SPACER ARRAY PATTERN OF DISPLAY PANEL, GENERATING DEVICE THEREOF, AND ELECTRONIC DEVICE

RELATED APPLICATIONS

This application is a National Phase of PCT Patent Application No. PCT/CN2021/095489 having International filing date of May 24, 2021, which claims the benefit of priority of Chinese Patent Application No. 202110501303.1 filed on May 8, 2021. The contents of the above applications are all incorporated by reference as if fully set forth herein in their entirety.

FIELD AND BACKGROUND OF THE INVENTION

The present application is related to the field of display technology and specifically to a generating method of a post spacer array pattern of a display panel, a generating device thereof, and an electronic device.

A thin-film transistor liquid crystal display panel (TFT-LCD) is a liquid crystal cell formed by aligning and laminating a thin-film transistor array substrate and a color filter substrate corresponding to each other. When the thin-film transistor array substrate and the color filter substrate are aligned and laminated, it is necessary to dispose post spacers (PS) with a supporting function between the thin-film transistor array substrate and the color filter substrate to maintain a cell thickness of the liquid crystal cell. The post spacers include main post spacers (main PS) and sub post spacers (sub PS). A height of each of the main post spacers is greater than a height of each of the sub post spacers. A number of the main post spacers is less than a number of the sub post spacers. The main post spacers mainly support the thickness of the liquid crystal cell, and the sub post spacers generally support the thin-film transistor liquid crystal display panel when it is squeezed. In other words, when the thin-film transistor liquid crystal display panel is squeezed, the main post spacers first bear all pressure, and when the pressure reaches a threshold of pressure that the main post spacers can bear, the sub post spacers will assist the main post spacers to bear part of the pressure.

In a design process of the post spacers, prior art mainly relies on a designer to draw a post spacer array pattern including the main post spacers and the sub post spacers. When the designer judges that the main post spacers and the sub post spacers do not meet design rules, the post spacer array pattern needs to be modified again. Due to a large number of the design rules, problems of omission, misjudgment, and improper modification are prone to occur if the designer relies on subjective experiences to make judgments and modifications. This greatly reduces design efficiency and prolongs a design cycle.

SUMMARY OF THE INVENTION

The present application provides a generating method of a post spacer array pattern of a display panel, a generating device thereof, and an electronic device to solve problems of low efficiency and low accuracy in a design process of post spacers of a current display panel.

In a first aspect, the present application provides a generating method of a post spacer array pattern of a display panel. The post spacer array pattern includes a plurality of types of post spacers. The generating method includes steps of:

obtaining a drawing layer data, a ratio data, and a positioning mode data of each of the types of the post spacers determined by a user; and generating the post spacer array pattern according to the drawing layer data, the ratio data, the positioning mode data, and a preset design rule of each of the types of the post spacers.

In an embodiment, in any one of the types of the post spacers, the preset design rule of the one of the types of the post spacers includes any one or more of:

a relationship between the ratio data of the one of the types of the post spacers, an area of all the types of the post spacers in a subpixel of the display panel, an area of the subpixel, and a number of the subpixels in a smallest repeating unit;

a size range of the one of the types of the post spacers; and a position relationship between the one of the types of the post spacers and other structures of the display panel.

In an embodiment, the relationship between the ratio data ratio of the one of the types of the post spacers, the area $S_{PS}$ of all the types of the post spacers in the subpixel of the display panel, the area $S_{pixel}$ of the subpixel, and the number Density of the subpixels in the smallest repeating unit is:

$$\text{ratio} = (S_{PS}/S_{pixel}) * \text{Density}$$

In an embodiment, the position relationship between the one of the types of the post spacers and the other structures of the display panel include any one or more of:

a distance range between different post spacers in the one of the types of the post spacers;

a distance range between the one of the types of the post spacers and another one of the types of the post spacers; and a distance range between the one of the types of the post spacers and a boundary of the subpixel where the one of the types of the post spacers is positioned.

In an embodiment, in any one of the types of the post spacers, the positioning mode data of the one of the types of the post spacers includes:

a color of the subpixel where the one of the types of the post spacers and/or an arrangement of the one of the types of the post spacers.

In an embodiment, the arrangement of the one of the types of the post spacers include an oblique arrangement and a staggered arrangement. In the oblique arrangement, any three column spacers adjacent to each other in the one of the types of the post spacers constitute three vertices of a non-isosceles triangle. In the staggered arrangement, any three column spacers adjacent to each other in the one of the types of the post spacers constitute three vertices of an isosceles triangle.

In an embodiment, after the step of generating the post spacer array pattern according to the drawing layer data, the ratio data, the positioning mode data, and the preset design rule of each of the types of the post spacers, the generating method further includes:

regenerating the post spacer array pattern according to the drawing layer data, the ratio data, the positioning mode data, and the preset design rule of each of the types of the post spacers if the subpixels of the display panel are updated.

In a second aspect, the present application provides a generating device of a post spacer array pattern of a display panel. The post spacer array pattern includes a plurality of types of post spacers. The generating device includes:

an obtaining module configured to obtain a drawing layer data, a ratio data, and a positioning mode data of each of the types of the post spacers input by a user; and a generating module configured to generate the post spacer array pattern according to the drawing layer data, the ratio data, the positioning mode data, and a preset design rule of each of the types of the post spacers.

In an embodiment, in any one of the types of the post spacers, the preset design rule of the one of the types of the post spacers includes any one or more of:

a relationship between the ratio data of the one of the types of the post spacers, an area of all the types of the post spacers in a subpixel of the display panel, an area of the subpixel, and a number of the subpixels in a smallest repeating unit;

a size range of the one of the types of the post spacers; and a position relationship between the one of the types of the post spacers and other structures of the display panel.

In an embodiment, the relationship between the ratio data ratio of the one of the types of the post spacers, the area $S_{PS}$ of all the types of the post spacers in the subpixel of the display panel, the area $S_{pixel}$ of the subpixel, and the number Density of the subpixels in the smallest repeating unit is:

$$\text{ratio} = (S_{PS}/S_{pixel}) * \text{Density}$$

In an embodiment, the position relationship between the one of the types of the post spacers and the other structures of the display panel include any one or more of:

a distance range between different post spacers in the one of the types of the post spacers;

a distance range between the one of the types of the post spacers and another one of the types of the post spacers; and a distance range between the one of the types of the post spacers and a boundary of the subpixel where the one of the types of the post spacers is positioned.

In an embodiment, in any one of the types of the post spacers, the positioning mode data of the one of the types of the post spacers includes:

a color of the subpixel where the one of the types of the post spacers and/or an arrangement of the one of the types of the post spacers.

In an embodiment, the arrangement of the one of the types of the post spacers include an oblique arrangement and a staggered arrangement. In the oblique arrangement, any three column spacers adjacent to each other in the one of the types of the post spacers constitute three vertices of a non-isosceles triangle. In the staggered arrangement, any three column spacers adjacent to each other in the one of the types of the post spacers constitute three vertices of an isosceles triangle.

In an embodiment, the generating device further includes:

an updating module configured to regenerate the post spacer array pattern according to the drawing layer data, the ratio data, the positioning mode data, and the preset design rule of each of the types of the post spacers if the subpixels of the display panel are updated.

In a third aspect, the present application provides a electronic device including a memory, a processor, and a computer program stored in the memory and executed in the processor. When the computer program is executed, the processor executes steps of:

obtaining a drawing layer data, a ratio data, and a positioning mode data of each of the types of the post spacers determined by a user; and generating the post spacer array pattern according to the drawing layer data, the ratio data, the positioning mode data, and a preset design rule of each of the types of the post spacers.

In an embodiment, in any one of the types of the post spacers, the preset design rule of the one of the types of the post spacers includes any one or more of:

a relationship between the ratio data of the one of the types of the post spacers, an area of all the types of the post spacers in a subpixel of the display panel, an area of the subpixel, and a number of the subpixels in a smallest repeating unit;

a size range of the one of the types of the post spacers; and a position relationship between the one of the types of the post spacers and other structures of the display panel.

In an embodiment, the relationship between the ratio data ratio of the one of the types of the post spacers, the area $S_{PS}$ of all the types of the post spacers in the subpixel of the display panel, the area $S_{pixel}$ of the subpixel, and the number Density of the subpixels in the smallest repeating unit is:

$$\text{ratio} = (S_{PS}/S_{pixel}) * \text{Density}$$

In an embodiment, the position relationship between the one of the types of the post spacers and the other structures of the display panel include any one or more of:

a distance range between different post spacers in the one of the types of the post spacers;

a distance range between the one of the types of the post spacers and another one of the types of the post spacers; and a distance range between the one of the types of the post spacers and a boundary of the subpixel where the one of the types of the post spacers is positioned.

In an embodiment, in any one of the types of the post spacers, the positioning mode data of the one of the types of the post spacers includes:

a color of the subpixel where the one of the types of the post spacers and/or an arrangement of the one of the types of the post spacers.

In an embodiment, the arrangement of the one of the types of the post spacers include an oblique arrangement and a staggered arrangement. In the oblique arrangement, any three column spacers adjacent to each other in the one of the types of the post spacers constitute three vertices of a non-isosceles triangle. In the staggered arrangement, any three column spacers adjacent to each other in the one of the types of the post spacers constitute three vertices of an isosceles triangle.

In a design stage of the post spacers of the display panel, the present application presets the design rule of each of the types of the post spacers in a plug-in corresponding to the generating method of the post spacer array pattern or a generating program of the post spacer array pattern of the display panel in advance. Therefore, this can generate the post spacer array pattern that meets requirements of the user according to the drawing layer data, the ratio data, and the positioning mode data of each of types of the post spacers determined by the user. This realizes an intelligent design of the post spacers of the display panel and eliminates manual judgments and modifications, thereby increasing efficiency and accuracy of a design process of the post spacers of the display panel.

DESCRIPTION OF SPECIFIC EMBODIMENTS OF THE INVENTION

In order to make purposes, technical solutions, and effects of the present application clearer and more specific, the present application is further described in detail below with reference to the accompanying drawings and examples. It should be understood that the specific embodiments described herein are only used to explain the present application, and are not used to limit the present application.

The present application provides a generating method of a post spacer array pattern of a display panel, a generating device thereof, an electronic device, and a non-transitory computer-readable storage medium. Detailed descriptions are given below.

First, the generating method of the post spacer array pattern of the display panel in an embodiment of the present application is introduced. The generating method is executed in the electronic device. The electronic device can be a desktop terminal or a mobile terminal. The electronic device can also be specifically one of a mobile phone, a tablet computer, a notebook computer, etc., which is not specifically limited in an embodiment of the present application.

Figure 1:
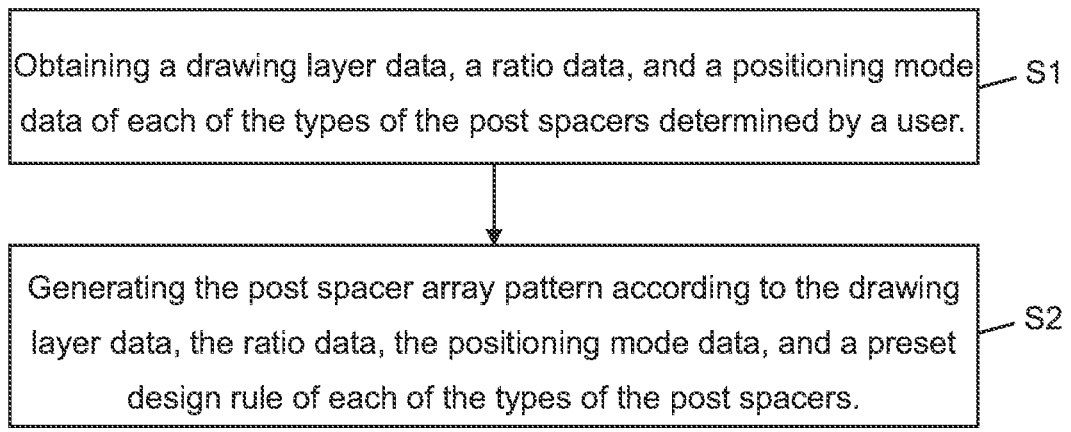
FIG. 1 is a flowchart of a generating method of a post spacer array pattern of a display panel provided by an embodiment of the present application.

FIG. 1 is a flowchart of the generating method of the post spacer array pattern of the display panel provided by an embodiment of the present application. As shown in FIG. 1, the generating method includes the following steps.

Step S1, obtaining a drawing layer data, a ratio data, and a positioning mode data of each of types of post spacers determined by a user.

Step S2, generating the post spacer array pattern according to the drawing layer data, the ratio data, the positioning mode data, and a preset design rule of each of the types of the post spacers.

In an embodiment of the present application, an execution process of the generating method of the post spacer array pattern of the display panel can be loaded in a design program of the display panel as a form of a plug-in, or it can be a generating program of the post spacer array pattern independent of the design program of the display panel, as long as it can obtain a drawing layer data, a ratio data, and a positioning mode data of each of the types of the post spacers determined by a user in the design program of the display panel. For example, a call interface can be predefined in the plug-in corresponding to the generating method of the post spacer array pattern or the generating program of the post spacer array pattern of the display panel, so as to collect the drawing layer data, the ratio data, and the positioning mode data of each of the types of the post spacers determined by the user in the design program of the display panel.

The design program of the display panel can be an electronic design automation (EDA) program for designing current display panels, such as Protel, Altium Designer, PSPICE, OrCAD, etc.

The post spacer array pattern includes a plurality of types of the post spacers. In an embodiment of the present application, the post spacer array pattern includes at least two types of the post spacers. The two types of the post spacers are main post spacers and sub post spacers.

Different types of the post spacers have different drawing layer data. The drawing layer data is configured to reflect a height of each of the post spacers, which means that the heights of the post spacers generated according to different drawing layer data are different. In an embodiment of the present application, a plurality of the drawing layer data at least include a first drawing layer data and a second drawing layer data. A height of each of the post spacers generated according to the first drawing layer data is greater than a height of each of the post spacers generated according to the second drawing layer data. The main post spacers can be generated according to the first drawing layer data, and the sub post spacers can be generated according to the second drawing layer data.

Figure 2:
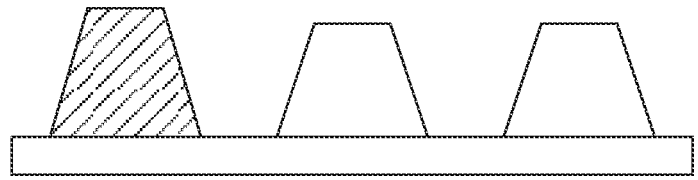
FIG. 2 is a side-view of the post spacer array pattern provided by an embodiment of the present application.

FIG. 2 is a side-view of the post spacer array pattern provided by an embodiment of the present application. As shown in FIG. 2, the post spacer array pattern includes the post spacers. Part of the post spacers are the main post spacers (trapezoids filled with black diagonal lines), and rest part of the post spacers are sub post spacers (trapezoids with no color filled). The main post spacers are generated according to the first drawing layer data, and the sub post spacers are generated according to the second drawing layer data.

Figure 3:
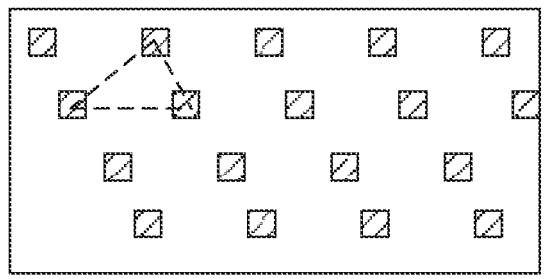
FIG. 3 is a top-view of the post spacer array pattern provided by an embodiment of the present application.

FIG. 3 is a top-view of the post spacer array pattern provided by an embodiment of the present application. As shown in FIG. 3, the post spacer array pattern includes the post spacers. Part of the post spacers are main post spacers (rectangles filled with black diagonal lines), and rest part of the post spacers are sub post spacers (rectangles with no color filled). The post spacers form a plurality of smallest repeating units. A category, a number, and an arrangement of the post spacers in different smallest repeating units are same. FIG. 3 shows only one smallest repeating unit, and the smallest repeating unit includes four main post spacers. The four main post spacers form a rectangular frame (indicated by black dashed lines). The smallest repeating unit further includes the sub post spacers, and the sub post spacers are respectively positioned on sides and inside the rectangular frame. Each of the post spacers is positioned in a corresponding subpixel, and a region surrounded by each of black solid line rectangular frames in FIG. 3 represents a subpixel.

In any one of the types of the post spacers of the main post spacers and the sub post spacers, the ratio data ratio of the one of the types of the post spacers is related to an area $S_{PS}$ of all the types of the post spacers in the subpixel of the display panel, an area $S_{pixel}$ of the subpixel, and a number Density of the subpixels in the smallest repeating unit. A relationship between the above four is:

$$\text{ratio}=(S_{PS}/S_{pixel})*\text{Density}$$

Figure 4:
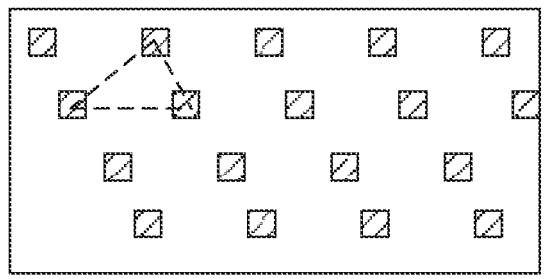
FIG. 4 is a schematic diagram of an oblique arrangement of post spacers provided by an embodiment of the present application.
Figure 5:
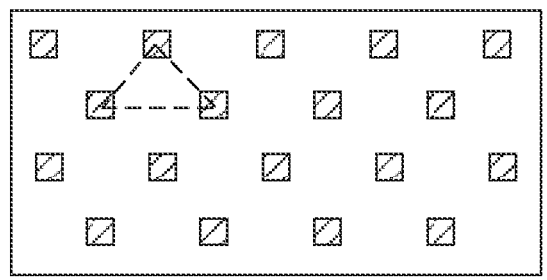
FIG. 5 is a schematic diagram of a staggered arrangement of the post spacers provided by an embodiment of the present application.

In any one of the types of the post spacers, the positioning mode data of the one of the types of the post spacers includes a color of the subpixel where the one of the types of the post spacers and/or an arrangement of the one of the types of the post spacers. The arrangement of the one of the types of the post spacers can include an oblique arrangement and a staggered arrangement. FIG. 4 is a schematic diagram of the oblique arrangement of the post spacers provided by an embodiment of the present application. In the oblique arrangement, any three column spacers adjacent to each other in the one of the types of the post spacers constitute three vertices of a non-isosceles triangle. FIG. 5 is a schematic diagram of the staggered arrangement of the post spacers provided by an embodiment of the present application. In the staggered arrangement, any three column spacers adjacent to each other in the one of the types of the post spacers constitute three vertices of an isosceles triangle.

In any one of the types of the post spacers, the preset design rule of the one of the types of the post spacers includes any one or more of: the relationship between the ratio data of the one of the types of the post spacers, the area of all the types of the post spacers in the subpixel of the display panel, the area of the subpixel, and the number of the subpixels in the smallest repeating unit; a size range of the one of the types of the post spacers; and a position relationship between the one of the types of the post spacers and other structures of the display panel.

In any one of the types of the post spacers, the relationship between the ratio data of the one of the types of the post spacers, the area of all the types of the post spacers in the subpixel of the display panel, the area of the subpixel, and the number of the subpixels in the smallest repeating unit has been described in detail in the above embodiments and is not repeatedly described herein.

In any one of the types of the post spacers, such as the main post spacers, the size range of the main post spacers refers to the size range of one of the main post spacers.

In any one of the types of the post spacers, such as the main post spacers, the position relationship between the main post spacers and other structures of the display panel includes any one or more of a distance range between different main post spacers, a distance range between the main post spacers and another types of the post spacers, such as the sub post spacers, and a distance range between the main post spacers and a boundary of the subpixel where the main post spacers is positioned.

In the generating method provided by an embodiment of the present application, in a design stage of the post spacers of the display panel, the present application presets the design rule of each of the types of the post spacers in the plug-in corresponding to the generating method of the post spacer array pattern or the generating program of the post spacer array pattern of the display panel in advance. Therefore, this can generate the post spacer array pattern that meets requirements of the user according to the drawing layer data, the ratio data, and the positioning mode data of each of types of the post spacers determined by the user. This realizes an intelligent design of the post spacers of the display panel and eliminates manual judgments and modifications, thereby increasing efficiency and accuracy of a design process of the post spacers of the display panel.

In an embodiment, after the step of generating the post spacer array pattern according to the drawing layer data, the ratio data, the positioning mode data, and the preset design rule of each of the types of the post spacers, the generating method further includes:

regenerating the post spacer array pattern according to the drawing layer data, the ratio data, the positioning mode data, and the preset design rule of each of the types of the post spacers if the subpixels of the display panel are updated.

It can be understood that the post spacers are positioned in the subpixel, and the color of the subpixels where different types of the post spacers are positioned may be different, so after generating the post spacer array pattern according to the drawing layer data, the ratio data, the positioning mode data, and the preset design rule of each of the types of the post spacers, if the subpixels of the display panel are changed, for example, the size, the color, or the arrangement of the subpixels is changed, the post spacer array pattern is regenerated according to the drawing layer data, the ratio data, the positioning mode data, and the preset design rule of each type of the post spacers. Because the generating method of the post spacer array pattern has been described in detail in the above embodiments, it is not repeatedly described herein.

Figure 6:
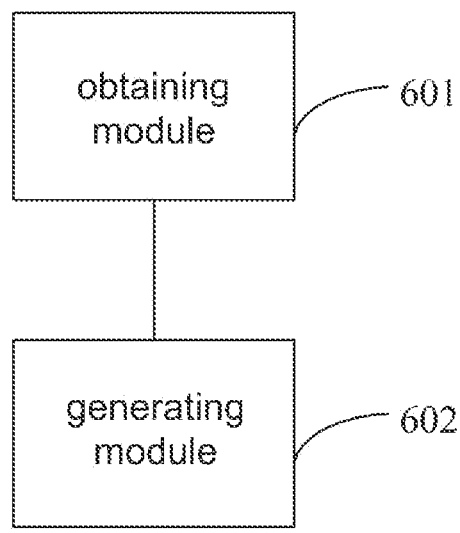
FIG. 6 is a structural schematic diagram of a generating device of the post spacer array pattern provided by an embodiment of the present application.

FIG. 6 is a structural schematic diagram of a generating device of the post spacer array pattern provided by an embodiment of the present application. As shown in FIG. 6, the generating device includes: an obtaining module 601 configured to obtain the drawing layer data, the ratio data, and the positioning mode data of each of the types of the post spacers input by the user; and a generating module 602 configured to generate the post spacer array pattern according to the drawing layer data, the ratio data, the positioning mode data, and a preset design rule of each of the types of the post spacers.

It should be explained that the generating device provided in an embodiment of the present application is configured to execute the generating method in the above embodiments. Because the generating method has been described in detail in the above embodiments, the generating device is not repeatedly described herein.

In the generating device provided by an embodiment of the present application, in the design stage of the post spacers of the display panel, the present application presets the design rule of each of the types of the post spacers in the plug-in corresponding to the generating method of the post spacer array pattern or the generating program of the post spacer array pattern of the display panel in advance. Therefore, this can generate the post spacer array pattern that meets requirements of the user according to the drawing layer data, the ratio data, and the positioning mode data of each of types of the post spacers determined by the user. This realizes an intelligent design of the post spacers of the display panel and eliminates manual judgments and modifications, thereby increasing efficiency and accuracy of a design process of the post spacers of the display panel.

Based on a same principle, an embodiment of the present application further provides an electronic device. The electronic device includes a memory, a processor, and a computer program stored in the memory and executed in the processor. When the computer program is executed with any one of the generating methods provided by the embodiments of the present application, the processor executes steps of:
obtaining the drawing layer data, the ratio data, and the positioning mode data of each of the types of the post spacers determined by the user; and generating the post spacer array pattern according to the drawing layer data, the ratio data, the positioning mode data, and the preset design rule of each of the types of the post spacers.

Based on the same principle, an embodiment of the present application further provides a non-transitory computer-readable storage medium. The non-transitory computer-readable storage medium stores the computer program. When the computer program is executed with any one of the generating methods provided by the embodiments of the present application, the processor executes steps of:

obtaining the drawing layer data, the ratio data, and the positioning mode data of each of the types of the post spacers determined by the user; and generating the post spacer array pattern according to the drawing layer data, the ratio data, the positioning mode data, and the preset design rule of each of the types of the post spacers.

It can be understood that the non-transitory computer-readable storage medium stores the computer program corresponding to the generating method of the post spacer array pattern of the display panel.

Figure 7:
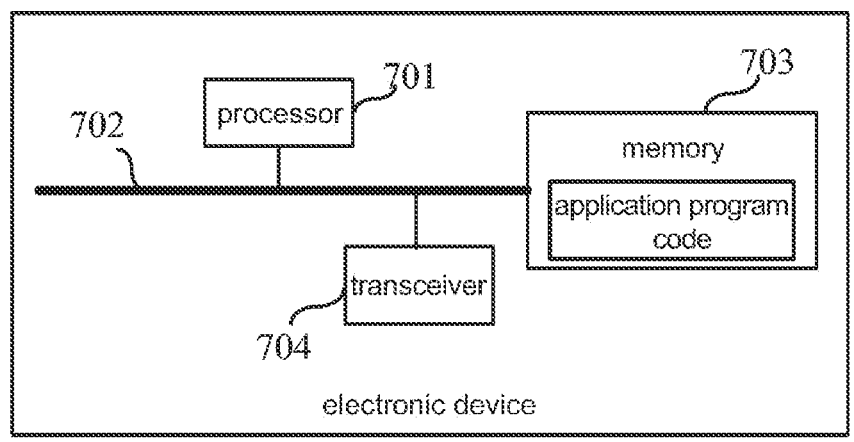
FIG. 7 is a structural schematic diagram of an electronic device provided by an embodiment of the present application.

FIG. 7 is a structural schematic diagram of the electronic device provided by an embodiment of the present application. As shown in FIG. 7, the electronic device includes the processor 701 and the memory 703. The processor 701 and the memory 703 are connected, for example, they are connected through a bus line 702. Furthermore, the electronic device can further include a transceiver 704. The electronic device can exchange data with other electronic devices through the transceiver 704. It should be explained that in an actual implementation, the transceiver 704 is not limited to one, and a structure of the electronic device does not constitute a limitation to an embodiment of the present application.

The processor 701 is applied to an embodiment of the present application and can be configured to realize functions of the generating device shown in FIG. 6.

The processor 701 can be a central processing unit (CPU), a general-purpose processor, a digital signal processor (DSP), an application specific integrated circuit (ASIC), a field programmable gate array (FPGA), or other programmable logic devices, transistor logic devices, hardware components, or any combination thereof. The processor 701 can realize or execute various exemplary logical blocks, modules, and circuits described in conjunction with a disclosure of the present application. The processor 701 can further be a combination that realizes computing functions, for example, a combination of one or more of micro-processors, and a combination of the DSP and the micro-processors.

The bus line 702 can include a path for transferring information between the above components. The bus line 702 can be a peripheral component interconnect (PCI) bus line, an enhanced industry standard architecture (EISA) bus line, or the like. The bus line 702 can be divided into an address bus line, a data bus line, a control bus line, and so on. For ease of representation, only one thick line is used to represent the bus line in FIG. 7, but it does not mean that there is only one bus line or one type of the bus line.

The memory 703 can be a read-only memory (ROM) or other types of static storage devices that can store static information and instructions, can be a random access memory (RAM) or other types of dynamic storage devices that can store information and instructions, can be an electrically-erasable programmable read-only memory (EEPROM), a compact disc read-only memory (CD-ROM), or other optical disk storage (including compact discs, laser discs, optical discs, digital versatile discs, Blu-ray discs, etc.), magnetic disk storage media, or other magnetic storage devices, or can be configured to carry or store desired program codes in a form of instructions or data structures and any other medium that can be accessed by a computer, but is not limited to this.

The memory 703 is configured to store an application program code for executing solutions of the present application, and the processor 701 controls the execution. The processor 701 is configured to execute the application program code stored in the memory 703 to realize actions of the generating device provided in the embodiment shown in FIG. 6.

It should be understood that although each of the steps in the flowchart of the drawings are sequentially shown as indicated by arrows, these steps are not necessarily performed in an order indicated by the arrows. Unless otherwise expressly stated herein, an implementation of these steps is not strictly limited in the order, and they can be performed in other orders. Moreover, at least some of the steps in the flowchart of the drawings can include a plurality of sub-steps or stages, and the plurality of sub-steps or stages are not necessarily performed at a same time but can be performed at different times, and the plurality of sub-steps or stage are not necessary to be performed sequentially but can be performed alternately with at least a portion of other steps or sub-steps or stages of other steps.

It can be understood that those having ordinary skills of the art may easily contemplate various changes and modifications of the technical solution and technical ideas of the present application and all these changes and modifications are considered within the protection scope of right for the present application.

What is claimed is:

1. A generating method of a post spacer array pattern of a display panel, wherein the post spacer array pattern comprises a plurality of types of post spacers, and the generating method comprises:

obtaining a drawing layer data, a ratio data, and a positioning mode data of each of the types of the post spacers determined by a user; and generating the post spacer array pattern according to the drawing layer data, the ratio data, the positioning mode data, and a preset design rule of each of the types of the post spacers, wherein the post spacer array pattern comprises a plurality of post spacers, the plurality of post spacers forms a plurality of smallest repeating units, the post spacers in different ones of the smallest repeating units have a same category, same number, and a same arrangement, and the plurality of post spacers are positioned in subpixels of the display panel in a one-to-one correspondence;

wherein in any one of the types of the post spacers, the preset design rule of the one of the types of the post spacers comprises any one or more of:

a relationship between the ratio data of the one of the types of the post spacers, an area of all the types of the post spacers in a subpixel of the display panel, an area of the subpixel, and a number of the subpixels in a smallest repeating unit;

a size range of the one of the types of the post spacers;

a position relationship between the one of the types of the post spacers and other structures of the display panel; and the plurality of types of post spacers comprise main post spacers and sub post spacers arranged in an array pattern, in a first direction of the post spacer array pattern, a periodic length of the main post spacers is six times greater than a periodic length of the sub post spacers, and in a second direction of the post spacer array pattern perpendicular to the first direction, a periodic length of the main post spacers is three times greater than a periodic length of the sub post spacers.

2. The generating method according to claim 1, wherein the relationship between the ratio data ratio of the one of the types of the post spacers, the area $S_{PS}$ of all the types of the post spacers in the subpixel of the display panel, the area $S_{pixel}$ of the subpixel, and the number Density of the subpixels in the smallest repeating unit is:

$$ratio=(S_{PS}/S_{pixel})*Density.$$

3. The generating method according to claim 1, wherein the position relationship between the one of the types of the post spacers and the other structures of the display panel comprises any one or more of:
 a distance range between different post spacers in the one of the types of the post spacers;
 a distance range between the one of the types of the post spacers and another one of the types of the post spacers; and
 a distance range between the one of the types of the post spacers and a boundary of the subpixel where the one of the types of the post spacers is positioned.

4. The generating method according to claim 1, wherein in any one of the types of the post spacers, the positioning mode data of the one of the types of the post spacers comprises:
 a color of the subpixel where the one of the types of the post spacers and/or an arrangement of the one of the types of the post spacers.

5. The generating method according to claim 4, wherein the arrangement of the one of the types of the post spacers comprise an oblique arrangement and a staggered arrangement;
 in the oblique arrangement, any three column spacers adjacent to each other in the one of the types of the post spacers constitute three vertices of a non-isosceles triangle; and
 in the staggered arrangement, any three column spacers adjacent to each other in the one of the types of the post spacers constitute three vertices of an isosceles triangle.

6. The generating method according to claim 5, wherein after the step of generating the post spacer array pattern according to the drawing layer data, the ratio data, the positioning mode data, and the preset design rule of each of the types of the post spacers, the generating method further comprises:
 regenerating the post spacer array pattern according to the drawing layer data, the ratio data, the positioning mode data, and the preset design rule of each of the types of the post spacers if the subpixels of the display panel are updated.

7. A generating device of a post spacer array pattern of a display panel, wherein the post spacer array pattern comprises a plurality of types of post spacers, and the generating device comprises:
 an obtaining module configured to obtain a drawing layer data, a ratio data, and a positioning mode data of each of the types of the post spacers input by a user; and
 a generating module configured to generate the post spacer array pattern according to the drawing layer data, the ratio data, the positioning mode data, and a preset design rule of each of the types of the post spacers, wherein the post spacer array pattern comprises a plurality of post spacers, the plurality of post spacers forms a plurality of smallest repeating units, the post spacers in different ones of the smallest repeating units have a same category, same number, and a same arrangement, and the plurality of post spacers are positioned in subpixels of the display panel in a one-to-one correspondence;

wherein in any one of the types of the post spacers, the preset design rule of the one of the types of the post spacers comprises any one or more of:
 a relationship between the ratio data of the one of the types of the post spacers, an area of all the types of the post spacers in a subpixel of the display panel, an area of the subpixel, and a number of the subpixels in a smallest repeating unit;
 a size range of the one of the types of the post spacers;
 a position relationship between the one of the types of the post spacers and other structures of the display panel; and
 the plurality of types of post spacers comprise main post spacers and sub post spacers arranged in an array pattern,
 in a first direction of the post spacer array pattern, a periodic length of the main post spacers is six times greater than a periodic length of the sub post spacers, and
 in a second direction of the post spacer array pattern perpendicular to the first direction, a periodic length of the main post spacers is three times greater than a periodic length of the sub post spacers.

8. The generating device according to claim 7, wherein the relationship between the ratio data ratio of the one of the types of the post spacers, the area $S_{PS}$ of all the types of the post spacers in the subpixel of the display panel, the area $S_{pixel}$ of the subpixel, and the number Density of the subpixels in the smallest repeating unit is:

$$ratio=(S_{PS}/S_{pixel})*Density.$$

9. The generating device according to claim 7, wherein the position relationship between the one of the types of the post spacers and the other structures of the display panel comprises any one or more of:
 a distance range between different post spacers in the one of the types of the post spacers;
 a distance range between the one of the types of the post spacers and another one of the types of the post spacers; and
 a distance range between the one of the types of the post spacers and a boundary of the subpixel where the one of the types of the post spacers is positioned.

10. The generating device according to claim 7, wherein in any one of the types of the post spacers, the positioning mode data of the one of the types of the post spacers comprises:
 a color of the subpixel where the one of the types of the post spacers and/or an arrangement of the one of the types of the post spacers.

11. The generating device according to claim 10, wherein the arrangement of the one of the types of the post spacers comprise an oblique arrangement and a staggered arrangement;

in the oblique arrangement, any three column spacers adjacent to each other in the one of the types of the post spacers constitute three vertices of a non-isosceles triangle; and in the staggered arrangement, any three column spacers adjacent to each other in the one of the types of the post spacers constitute three vertices of an isosceles triangle.

12. The generating device according to claim 11, further comprising:

an updating module configured to regenerate the post spacer array pattern according to the drawing layer data, the ratio data, the positioning mode data, and the preset design rule of each of the types of the post spacers if the subpixels of the display panel are updated.

13. An electronic device, comprising a memory, a processor, and a computer program stored in the memory and executed in the processor, wherein when the computer program is executed, the processor executes operations of:

obtaining a drawing layer data, a ratio data, and a positioning mode data of each of the types of the post spacers determined by a user; and generating the post spacer array pattern according to the drawing layer data, the ratio data, the positioning mode data, and a preset design rule of each of the types of the post spacers, wherein the post spacer array pattern comprises a plurality of post spacers, the plurality of post spacers forms a plurality of smallest repeating units, the post spacers in different ones of the smallest repeating units have a same category, same number, and a same arrangement, and the plurality of post spacers are positioned in subpixels of the display panel in a one-to-one correspondence;

wherein in any one of the types of the post spacers, the preset design rule of the one of the types of the post spacers comprises any one or more of:

a relationship between the ratio data of the one of the types of the post spacers, an area of all the types of the post spacers in a subpixel of the display panel, an area of the subpixel, and a number of the subpixels in a smallest repeating unit;

a size range of the one of the types of the post spacers;

a position relationship between the one of the types of the post spacers and other structures of the display panel; and the plurality of types of post spacers comprise main post spacers and sub post spacers arranged in an array pattern, in a first direction of the post spacer array pattern, a periodic length of the main post spacers is six times greater than a periodic length of the sub post spacers, and in a second direction of the post spacer array pattern perpendicular to the first direction, a periodic length of the main post spacers is three times greater than a periodic length of the sub post spacers.

14. The electronic device according to claim 13, wherein the relationship between the ratio data ratio of the one of the types of the post spacers, the area $S_{PS}$ of all the types of the post spacers in the subpixel of the display panel, the area $S_{pixel}$ of the subpixel, and the number Density of the subpixels in the smallest repeating unit is:

$$\text{ratio} = (S_{PS}/S_{pixel}) * \text{Density}.$$

15. The electronic device according to claim 13, wherein the position relationship between the one of the types of the post spacers and the other structures of the display panel comprises any one or more of:

a distance range between different post spacers in the one of the types of the post spacers;

a distance range between the one of the types of the post spacers and another one of the types of the post spacers; and a distance range between the one of the types of the post spacers and a boundary of the subpixel where the one of the types of the post spacers is positioned.

16. The electronic device according to claim 13, wherein in any one of the types of the post spacers, the positioning mode data of the one of the types of the post spacers comprises:

a color of the subpixel where the one of the types of the post spacers and/or an arrangement of the one of the types of the post spacers.

17. The electronic device according to claim 16, wherein the arrangement of the one of the types of the post spacers comprise an oblique arrangement and a staggered arrangement;

in the oblique arrangement, any three column spacers adjacent to each other in the one of the types of the post spacers constitute three vertices of a non-isosceles triangle; and in the staggered arrangement, any three column spacers adjacent to each other in the one of the types of the post spacers constitute three vertices of an isosceles triangle.

* * * * *